May 28, 1946.   O. J. HUELSTER   2,401,074
COUNTERSINK BEVEL RECESSING TOOL
Filed Feb. 23, 1944
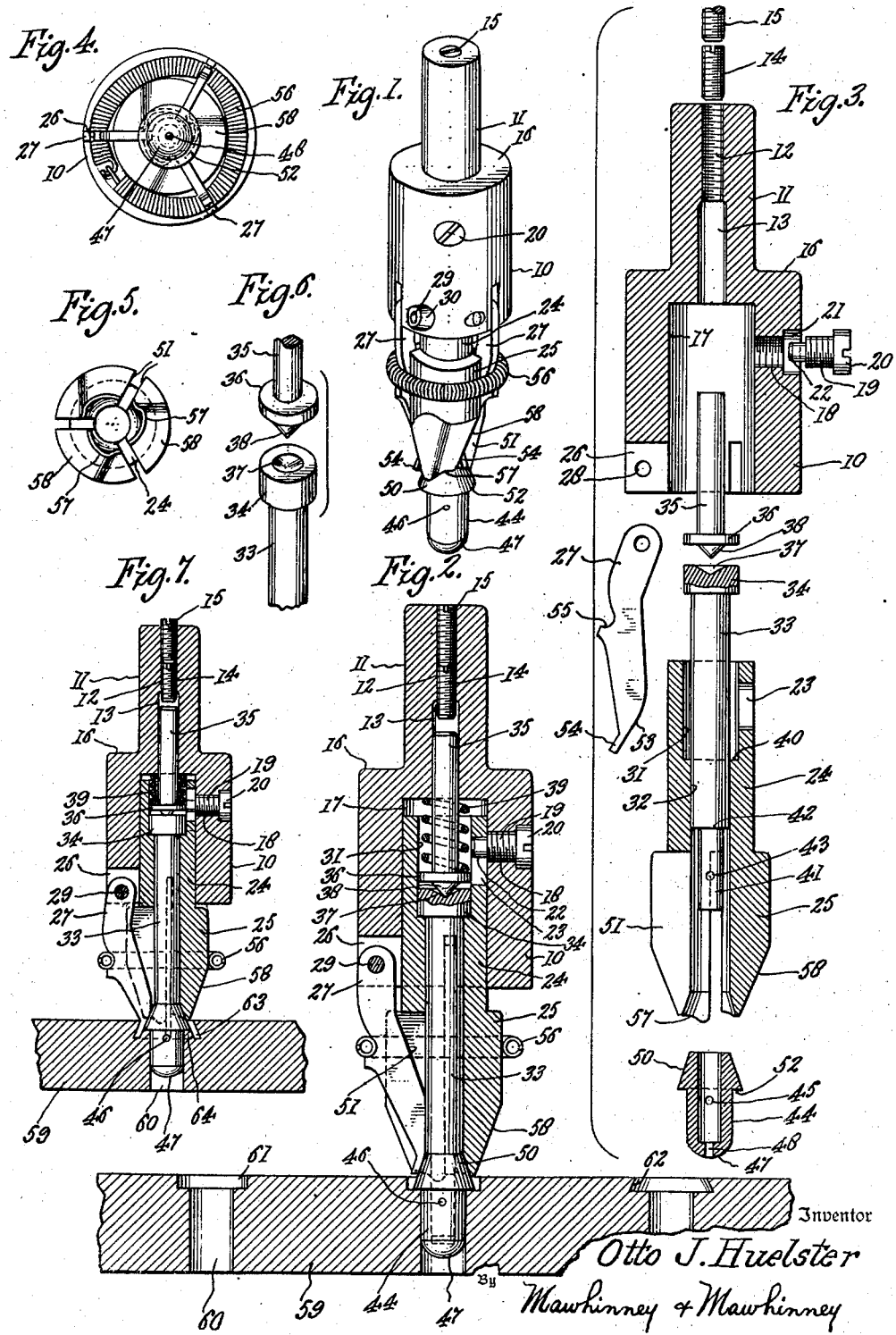
Inventor
Otto J. Huelster
By Mawhinney & Mawhinney
Attorneys Patented May 28, 1946

2,401,074

UNITED STATES PATENT OFFICE 2,401,074

COUNTERSINK BEVEL RECESSING TOOL

Otto J. Huelster, Waterbury, Conn., assignor to Scovill Manufacturing Company, Waterbury, Conn., a corporation of Connecticut Application February 23, 1944, Serial No. 523,609

18 Claims. (Cl. 77—58)

The present invention relates to improvements in countersink bevel recessing tools, and has for an object to provide a pilot member which is non-rotary to avoid marring or cutting the base of the groove, and in which the pilot member is constructed and arranged to take the axial thrust of the tool incident to the projection of the cutters into operative position against the side wall of the recess.

Another object of the invention is to provide, in combination with such pilot member, of automatically retractile countersink cutting means, adapted to be simultaneously moved inwards of the recess and expanded outwardly into countersink cutting engagement with the lateral wall of the recess.

A still further object of the invention resides in certain novel features in the bearings for the rapidly rotated elements of the tool, in which centering and true running of the tool is promoted to a high degree.

With the foregoing and other objects in view, the invention will be more fully decsribed hereinafter, and will be more particularly pointed out in the claims appended hereto.

In the drawing, wherein like symbols refer to like or corresponding parts throughout the several views, Figure 1 is a perspective view of a complete tool constructed in accordance with the present invention and shown apart from the work.

Figure 2 is a longitudinal central section taken on a slightly enlarged scale through the tool with the parts in an initial inoperative position with the cutters retracted and showing also in section a fragmentary view of the work.

Figure 3 is a similar view, omitting the work, with the parts detached.

Figure 4 is a bottom plan view of the tool.

Figure 5 is a bottom plan view of the spindle bushing of the tool.

Figure 6 is a fragmentary perspective view of the spindle and bearing pin showing the mating ends, and Figure 7 is a view, on a smaller scale, similar to Figure 2, showing the housing lowered and the cutters projected in accordance with a method of operation alternatively to that of Figure 2.

Referring more particularly to the drawing 10 designates a housing having at its upper portion a reduced neck 11. Within the neck is a threaded bore 12 and a smooth bore 13, with the threaded bore 12 opening upwardly through the upper end of the neck 11 and opening downwardly into the upper end of the smooth bore 13; such smooth bore 13 being preferably of slightly greater diameter as compared with the threaded bore 12. Within the threaded bore 12 are screwed a stop screw 14 and a set screw 15.

The differential external diameters of housing 10 and its neck 11 produces a shoulder 16 to take against the chuck or other part in which the neck 11 is received and made fast, such chuck or other part belonging to a machine for imparting rotation to the tool.

The lower end of the smooth bore 13 communicates with a socket 17 of larger diameter than the bore 13. Through one side wall of the housing 10 is made an opening threaded at 18, to receive the correspondingly threaded shank 19 of a stop screw, the head 20 of which is adapted to repose in a countersunk manner in a smooth recess 21 in the outer portion of the threaded opening 18. Upon the inner end of the stop screw shank 19 is a stop pin 22 projecting into the interior of the housing socket 17 and into a vertically elongated slot 23 made in the upper reduced section 24 of a tubular spindle bushing 25.

One or more slots 26 made in the lower end of the housing 10 and opening through such lower end of the housing accommodates the upper perforated end of a cutter or knife 27. The perforation is adapted to register with similar holes 28 in the walls of each slot 26 to accommodate a pin 29, the heads of which may be riveted or upset in recesses 30 in the housing which open on the exterior thereof at opposite sides of each slot 26.

While one cutting arm 27 may suffice, for the purpose of a balanced tool, I have illustrated three such cutter arms 27 distributed at equal intervals around the axis of the tool, the same being displaced angularly by approximately 120°.

The bushing section 24 is drilled axially by a large smooth bore 31 and a second adjoining smooth bore 32 of smaller diameter calculated to slidingly receive, and form a bearing for, the spindle 33 having the head 34 which is of a size to slide in the bore 31. A bearing pin 35 is slidably mounted in the smooth neck bore 13 and has an enlarged disc or other base 36, on the lower side of which is an inverted conic projection 38 positioned to enter a somewhat similar conic socket 37 in the upper side of the spindle head 34; except that the apex angle of the cone is less, for instance 90°, than the apex angle, for instance 120°, of the socket 37, which produces centering without excessive friction.

A coil spring 39 is wound in a suitable number of convolutions about the bearing pin 35 with one end abutting the base of the housing socket 17 and the other end taking against the upper side of the bearing pin base 36, acting to force the spindle head 34 down against shoulder 40 formed by the differential diameters 31 and 32 in the upper section of the housing 25.

The lower end 41 of the spindle 33 is reduced in diameter over that of the major portion of the spindle shank and results in the formation of a shoulder 42. In this reduced end is a cross hole 43 adapted to register with a similar transverse hole 45 in a hollow pilot member 44 which is secured by a pin 46 to the spindle with the upper end of the pilot member abutting the spindle shoulder 42. The pilot member 44 is preferably formed with a round external base 47 to facilitate insertion of the tool in the boring initially made in the work. The lower end of the pilot member 44 is closed except for a hole 48 of small diameter, which is for the purpose of exhausting air from the pilot member socket coincident with the assembly of the pilot member upon the spindle reduced end 41.

A knife or cutter spreader 50 is carried by the upper portion of the pilot member 44. In the instance shown the spreader 50 is in the frustum of a cone. An overhanging base flange 52 of the cone 50 acts as a stop in cooperation with the base of the recess, as hereinafter explained.

The lower, preferably thicker-walled portion of the spindle bushing 25 is formed with one or more slots 51 to agree in number and position with the cutter or knife blades 27 which are slidingly received in such slot or slots 51 in such position that the free bearing surfaces or edges 53 of the knife arms may rest upon the cone 50. The cutters are shown at 54.

Notches 55 in the knife arms 27 receive an encircling coil spring 56 by which all of the knife blades 27 are biased to a retracted position with the bearing surfaces 53 engaging the cone 50.

As shown in Figures 1, 3 and 5, the lower end of the bushing 25 is of generally conical form except that between the slots 51 the lower portions of the conic section 58 are cut away in the shape of a spiral or a generally volute curve, thus allowing for suitable clearance for the egress of cuttings or chips produced by the cutters 54. This particular shaping of the conic sections 58 results in a generally tapering knife-shaped edge at the lower extremities thereof of a pattern indicated generally at 57. These edges, referring to the direction of rotation of the tool, are lowest at their leading portions and gradually taper upwardly to the trailing end which is the highest point communicating with the next slot. This particular shaping of the lower ends of the conic sections, in addition to allowing for a clearance opening, also provides ample stock in the bushing 25 to back up the cutters 54 during the cutting operations.

In the operation of the tool, the work 59 is shown in Figure 2. This work is preformed with a bore 60 and a counterbore 61. The reduced shank or neck 11 of the housing is secured into a holder, such as a chuck of a drill press or a portable power drill. The tool is initially placed in the position shown in Figure 2 in which the pilot member 44 fits into the bore 60 and with the cone base 52 resting upon the base of the counterbore or recess 61. As the tool is rapidly rotated, the housing 10 is pushed toward the work. The two comparative positions are shown in Figures 2 and 7. This action causes the housing to move down on the spindle and bushing, whereupon the knives 54 will be forced outwardly by camming over the conic surface 50 of the pilot member. The knives 54 thus undercut the counterbore in the block 59 as shown at 62 in Figure 2.

Such movement of the housing relatively to the spindle bushing 25 will be against the influence of the coil spring 39, which functions to restore the parts to the initial position as soon as the axial pressure is removed from the housing 10.

The limit to which the knives 54 can undercut the counterbore is determined by the stop screw 14, the lower end of which projects into the smooth bore 13 and acts as an adjustable stop engaged by the upper end of the bearing pin 35. It will be noted that pilot member 44 of the spindle 33 engages the work and therefore the spindle cannot move axially and that the same is true of the bearing pin 35 which engages the spindle. Therefore when the housing 10 is caused to descend, the distance between the stop screw 14 and the bearing pin 35 will determine the axial travel permitted to the housing 10. This limits simultaneously the downward movement and the outward spread of the knives 54. The depth of cut is first determined, the stop screw 14 moved in or out accordingly by the use of a screw driver and thereupon the set screw 15 is tightened against the stop screw 14.

In Figure 7 the screws 14 and 15 are backed off or upwardly to a greater degree than shown in Figure 2. This permits the knives 54 to descend to a lower position undercutting a wall portion 63 that is annularly outward of an uncut ring 64 of the stock material, against which the cone base 52 engages.

A feature of particular importance is the fact that the spindle 33 does not turn with the tool during the cutting operation. When the pilot member and the shoulder 52 adjacent the cam surface 50 are seated into the bore 60 and counterbore 61 as provided in the support block 59 to be undercut, and pressure is applied to the tool, the spindle 33 will stop rotating due to the friction of the cam shoulder 52 against the base of the counterbore 61. However, the knives 54 will travel around the cam surface 50 during the axial movement of the knives to perform their undercutting operation. The purpose for preventing rotation of the spindle and pilot member during the operation of the tool is to prevent the shoulder 52 under the cam head 50 from marring or scoring the base of the counterbore 61.

Another novel feature is the pivotal connection between the bearing pin 35 and the spindle 33. This construction serves to produce a minimum frictional end bearing, and also serves to center the spindle relative to the bearing pin.

The spindle 33 is the only non-rotary part during the undercutting operation. The rotation imparted to the housing 10 by the machine will cause rotation of the knife blades 27, and the stop pin 22 of the set screw 20 will carry the bushing 25 around with the same. The friction of the coil spring 39 between the rotary housing part and the base 36 will also carry the bearing pin 35 around with the housing causing a relative rotation of the conic projection 38 in the stationary socket 37. The tapering surface 58 is relieved at 57 adjacent the cutting edges of the knives to allow room to eject the chips being cut out from the block during the undercutting operation.

While the drawing shows the knives to be disposed radially relative to the axis of the tool, it is within the purview of this invention to dispose these blades off in a slight angle relative to a true radial position and so as to provide for a suitable cutting angle for the blade such as is conventional practice in connection with milling cutters. The tool is designed not only for cutting a beveled undercut, but is applicable for undercutting recesses of various shapes.

It is obvious that various changes and modifications may be made in the details of construction and design of the above specifically described embodiment of this invention without departing from the spirit thereof, such changes and modifications being restricted only by the scope of the following claims:

What is claimed is:

1. A countersink cutting recessing tool comprising a non-rotary abutment member adapted to abut against the work to arrest further movement of said member, a rotary and slidable knife carrier, non-sliding spreader means positioned to be held against sliding by said abutment member, and a knife carried by and movable relatively to said carrier positioned to be acted on by said spreader means to cause expansion of the knife on sliding of said carrier toward the work, said spreader means and the cutting part of the knife being in substantial radial alignment.

2. A countersink cutting recessing tool according to claim 1, further characterized by the fact that yieldable means biases the carrier to a retracted position of the knife.

3. A countersink cutting recessing tool according to claim 1, wherein means is provided for normally retracting said knife to non-operative position, and means is provided for biasing said carrier to an outermost position with respect to the work.

4. A countersink cutting recessing tool comprising a non-rotary abutment member having a part for engaging the base of a preformed counterbore to frictionally arrest incidental rotation of said abutment member, a knife carrier outside said abutment member capable of both rotary movement and a movement slidable relatively to said abutment member toward and from the counterbore, yieldable means for urging said carrier to an outermost position away from the counterbore, a knife carried by and having a relative movement with respect to said carrier and having a cutting part positioned to enter said counterbore and a spreader over which a part of the knife is adapted to slide incident to the relative sliding movement of the carrier with respect to the abutment member whereby to cause expanding movement of the knife against the side wall of the counterbore.

5. A countersink cutting recessing tool comprising a knife carrier having means to rotate the same, a knife carried by and movable relatively to said carrier, means yieldably biasing the knife to retracted position, bearing means within said carrier on which said carrier rotates and slides comprising a spindle inside said carrier relatively rotatable with respect to said carrier, an abutment member connected to said spindle to engage the work and arrest incidental rotation of said spindle, a spreader also connected to said spindle and being radially within the cutting portion of said knife, said carrier being axially slidable with respect to said spindle and spreader, and yieldable means biasing the carrier to outer position.

6. A countersink cutting recessing tool according to claim 5 in which said bearing means further comprises a spindle bushing directly and internally receiving said spindle and directly externally receiving said carrier.

7. A countersink cutting recessing tool according to claim 5, in which said bearing means further comprises a bushing surrounding and rotatable on said spindle, and a bearing pin having a bearing in a portion of said carrier, said spindle and pin axially alined, and non-friction centering means between the adjacent ends of said pin and spindle.

8. A countersink bevel recessing tool comprising a socketed housing having means to rotate the same, a cutter pivoted thereto, a bushing having a part extending into the socket of said housing, a spindle in said bushing relatively rotatable with respect to said bushing, a bearing pin having a bearing in said housing and axially alined with said spindle, complemental centering members on the adjacent ends of said bearing pin and spindle, a coil spring constructed and arranged to urge said complemental members together and also tending to slide said housing outwardly on said bushing, stop means for limiting the last mentioned movement, and a spreader on said spindle in the path of the cutter.

9. A countersink bevel recessing tool comprising a pilot member, a spreader adjacent said pilot member, a spindle carrying said pilot and spreader, a slotted tubular bushing engaging said spreader and prevented thereby from axially shifting toward the work, said spindle lying through said bushing, a housing rotatably and slidably mounted over a portion of said bushing, a bearing pin having a bearing in said housing and axially alined with said spindle, centering means between said bearing pin and spindle, resilient means for urging said bearing pin toward said spindle and acting to move said housing outwardly on said bushing, stop means for preventing an excess of the last mentioned movement, cutters pivotally carried by said housing, freely movable in the slots of said bushing and having surfaces sliding in and out on said spreader, resilient means for drawing the cutters inwardly, and adjustable means to limit the sliding movement of said housing in the direction of expanding movement of the cutters on said spreader.

10. A bevel recessing tool comprising a pair of relatively slidable members, one member having means whereby the same may be rotated and the other member being axially slidable within said rotated member, cutter means mounted for pivotal movement relative to the rotated member and having slidable bearing engagement within the slidable member, a spindle having a spreader for the cutter means, said spindle constructed and arranged for relative rotative movement within said slidable member, a positive stop in said rotative member, a thrust bearing engaging one end of said spindle and having slidable movement to said positive stop, and yieldable means tending to urge said thrust bearing and spindle together and the rotatable and slidable members apart.

11. A cutting tool comprising a housing, one or more cutters carried by said housing, a bushing slidably and non-rotatably mounted in said housing, a pilot member rotatably supported by said bushing and axially movable therewith relative to the housing, spring means between the housing and pilot member for normally urging said pilot member and bushing to projected position relative to said housing, said pilot member having a part positioned to engage the work to arrest rotation of the pilot member while the housing and bushing rotate during the cutting operation.

12. A cutting tool comprising a housing, a plurality of spaced cutters pivotally carried by said housing for outward movement, a bushing slidably and non-rotatably mounted in said housing, said bushing having slots at its leading end within which said cutters move pivotally and are guided, said bushing further having its leading slotted end substantially conical shaped, and a spreader inwardly of the slots and fixed to the bushing with respect to relative axial motion whereby when the housing and cutters are slid axially relatively to the bushing and spreader in one direction said cutters will be expanded outwardly with respect to the slotted and conical leading end of the bushing.

13. A cutting tool according to claim 12 in which the substantially conical shaped end of the bushing in cross section has an exterior surface of a generally spiral shape between each of the successive blades.

14. For use with a piece of work having a counterbore with a base and outer wall, a countersink cutting recessing tool comprising an inner non-rotary abutment member having a part to enter the counterbore and frictionally engage the base to arrest rotation of the abutment member, a knife carrier outwardly of the abutment member having both rotary and sliding movements with respect to said abutment member, a knife carried by said knife carrier to rotate and slide therewith and having a substantially radial movement relatively to said carrier with a cutting edge adapted to enter the counterbore and move outwardly against the outer wall thereof, and cooperative means between the abutment member and said knife to cause outward radial movement of the cutting edge when the carrier is slid toward the counterbore.

15. A countersink cutting recessing tool as claimed in claim 14 in which said cooperative means comprises a cam wall on the abutment member positioned to enter the counterbore and being in contact with the inner face of the cutting edge.

16. A countersink cutting recessing tool according to claim 14 wherein the abutment member is a light spindle having thereon a cone forming with the inner face of the cutting edge the cooperative means recited with the base of the cone forming the part of the abutment member which engages the base of the counterbore.

17. For use with a preformed counterbore, a countersink bevel recessing tool comprising an inner abutment member having a part for engaging the base of the counterbore to stop incidental rotation of the abutment member, a bushing surrounding said abutment member, a knife carrier extending about said bushing slidable thereon but fixed to rotate said bushing, a knife rotating and sliding with said knife carrier and movable relatively thereto in a substantially radial direction, said knife having an inclined cutting edge adapted to enter the counterbore when the knife carrier is slid on the bushing toward the counterbore, means normally holding the knife in a radially inward retracted position, means on the abutment member adapted to enter the counterbore and constructed and arranged in sliding engagement with the cutting parts of the knife to move the knife radially outward when the knife carrier is slid relatively on the bushing toward the counterbore, and means for normally and yieldably sliding said knife carrier in the opposite direction.

18. For use with a piece of work having a counterbore with a base and side wall, a countersink bevel recessing tool comprising a non-rotary spindle having a part for entering the counterbore and frictionally engaging the base thereof to arrest rotation of said spindle, a bushing surrounding the spindle and rotatable but non-slidable thereon, a knife carrier exterior of said bushing fixed to rotate therewith but having a limited sliding movement on said bushing, a pin slidably mounted in said carrier in substantial axial alignment with said spindle and bearing on the inner end of said spindle, resilient means for urging the pin against the spindle and the carrier outwardly of the bushing, a knife carried by the carrier and having a radial movement with respect thereto, means to retract the knife in its radial movement, said knife having a cutting edge adapted to project into the counterbore, and cooperative means between the inside face of the knife cutting edge and said spindle to force the knife radially outward when moved inwardly into the counterbore.

OTTO J. HUELSTER.